United States Patent Office 3,804,927
Patented Apr. 16, 1974

3,804,927
REACTION OF CHLOROPHOSPHAZENES (PHOSPHONITRILIC CHLORIDES) AND CYCLIC ETHERS
David Francis Lawson and James M. Willis, Akron, and Gary Stephen Kyker, Uniontown, Ohio, assignors to The Firestone Tire & Rubber Company, Akron, Ohio
No Drawing. Filed Sept. 20, 1972, Ser. No. 290,587
Int. Cl. C07f 9/22, 9/24
U.S. Cl. 260—977         4 Claims

ABSTRACT OF THE DISCLOSURE

The reaction of chlorophosphazenes with all types of reactive ethers (e.g. epoxides, oxetanes, oxanes, episulfides, etc.) is effected more efficiently by the use of soluble salts as the reaction catalysts, lithium halides being particularly preferred as catalysts.

The reaction may be represented as follows:

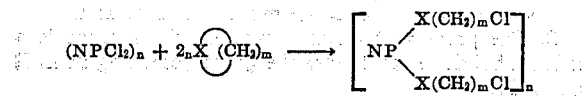

wherein
$n$ is an integer greater than 2,
$m$ is an integer from 2 up to 5,
X represents oxygen or sulfur.

---

This invention relates to the production of useful derivatives of chlorophosphazenes. More particularly it relates to an inexpensive and efficient synthesis of such derivatives by the reaction of chlorophosphazenes with all types of cyclic ethers including epoxides, oxetanes, oxanes, episulfides and the like, the reaction being catalyzed by the presence of a salt soluble in the reaction mixture, lithium halides being particularly preferred catalysts.

The principal object of the invention is to prepare derivatives of chlorophosphazenes which are useful as flame retardants, by reactions which utilize relatively inexpensive starting materials and which involve only moderate temperatures and moderate pressures and can be carried out in readily available glass-lined vessels.

The reaction is represented generally as follows:

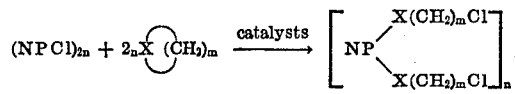

wherein
$n$ is an integer greater than 2,
$m$ is an integer from 2 to 5,
X is a sulfur or oxygen atom.

The chlorophosphazenes which are suitable in the practice of this invention are known and their preparation is described in the literature, e.g. in "Structural Chemistry of Inorganic Compounds" by W. Huckel, vol. II, chapter IX, part 2, section 6 (1951) and elsewhere in the literature. They are prepared by the reaction of ammonium chloride with phosphorus pentachloride, and depending on the reaction conditions and post treatments they may be oligomers or polymers, and may be either cyclic, straight chain or a combination of the two. The value of $n$ is an integer greater than two and the invention is applicable to the trimer, tetramer and other higher poly(chlorophosphazenes), both linear and cyclic, as well as to partially esterified or amidified cyclic or linear polyphosphazenes which contain P-Cl functions, i.e. $(NPCl_x(OR)_y)_n$, $(NPCl_x(NHR')_y)_n$ or $$(NPCl_x(NR''R''')_y)_n$$

where R, R', R'', R''' can be any alkyl or aryl group and $0 < x < 2$, $y = 2 - x$.

The types of cyclic ethers to which the present invention is applicable include epoxides, oxetanes, oxanes, episulfides and the like. In general these are defined by the presence of a hetero-O or a hetero-S atom in a carbon ring. The following compounds are illustrative of those in the practice of this invention:

ethylene oxide
1,2-epoxypropane
1-fluoro-2,3-epoxypropane
1-chloro-2,3-epoxypropane
1-bromo-2,3-epoxypropane
1,1,1-trifluoro-2,3-epoxypropane
1,1,1-trichloro-2,3-epoxypropane
1,1,1-tribromo-2,3-epoxypropane
2-methyl-1,2-epoxypropane
1,2-epoxy-3-butene
2,3-epoxybutane
1,2-epoxybutane
ethyl glycidyl ether
phenyl glycidyl ether
glycidyl acrylate
glycidyl methacrylate
glycidyl crotonate
glycidyl cinnamate
styrene oxide
1,2-epoxycyclohexane
4-vinyl-1,2-epoxycyclohexane
4,5-benzo-1,2-epoxycyclohexene
oxetane
3-methyloxetane
3,3-dimethyloxetane
3,3-bis(chloromethyl)oxetane
3,3-bis(bromomethyl)oxetane
3,3-bis(ethoxymethyl)oxetane
3,3-bis(cyanomethyl)oxetane
1,4-epoxybutane(tetrahydrofuran)
1,4-epoxy-2-butene
1,5-epoxypentane
ethylene sulfide
propylene sulfide
cyclohexene sulfide
3-chloropropylene sulfide
thietane
3,3-dimethylthietane.

The reaction of chlorophosphazenes with epoxy compounds has been reported in the literature, e.g. in U.S. Pats. 3,641,193 and 2,909,446. The reaction proceeds only to very low percentages of completion (substitution) in the absence of a catalyst. Among the catalysts which have been suggested are $TiCl_4$ and quaternary ammonium hydroxides or ammonium salts. Such catalysts increase the yield substantially but not to completion.

Uncatalyzed reactions gave extremely low yields of the fully-substituted products. Use of trimeric chlorophosphazene, higher epoxides, quarternary alkylammonium halide catalysts or other solvents resulted in 40-60% incorporation.

It has now been found that the use of a catalyst which is soluble in the reaction mixture permits the reaction to be carried out to quantitative yields at relatively moderate temperatures and pressures.

Lithium halides are the preferred catalysts, lithium chloride and lithium bromide being particularly preferred. Those alkali metal halides which are not soluble in the reaction medium are not effective, these including NaCl, NaBr, NaI, KCl, KBr, KI, while CsF which exhibits some solubility in the reaction mixture was found to be effective, although yields were lower than with the lithium salts, possibly due to the lower solubility of the CsF.

The example which follows is illustrative of one presently preferred manner of practicing the invention:

The reactions were conducted in sealed glass polymerization bottles at temperatures of about 50° C. and pressures up to about 4 atmospheres.

A dry 300 ml. bottle was charged with 10.0 g. (0.097 mole) of sublimed $(NPCl_2)_4$, 100 ml. of freshly distilled tetrahydrofuran and 0.25 g. (0.028 mole) of anhydrous LiBr. The bottle was stoppered and cooled to 0° C. and 20 ml. of ethylene oxide (liq.) at 0° C. (excess epoxide) was added quickly. The bottle was fitted with a Teflon seal and stoppered tightly, then placed in a 50° C. agitator for 97 hours. The bottle was cooled to 0° C. and opened; solvent and excess epoxide were removed with a water aspirator leaving the product as a clear, yellow oil, which contained ca. 8% by wt. unremoved tetrahydrofuran. The oil weighed 18.3 g., corresponding to a quantitative incorporation of ethylene oxide. The oil had spectra and physical properties identical to an authentic sample prepared by an independent route and consistent with its expected structure:

The infrared spectrum run on a capillary film of the product deposited on sodium chloride plates showed strong absorptions at the following wave numbers: 1325, 1295, 1031 and 712 cm.$^{-1}$. The proton nuclear magnetic resonance spectrum of the product in deuterochloroform, determined with a 60 mHz. instrument, had two equal intensity absorptions at the following chemical shifts (in parts per million relative to tetramethylsilane): 3.74 (triplet, P—O—$CH_2$) and 4.25 (multiplet, —$CH_2Cl$). The product could be purified further by washing.

In the same manner, by the use of lithium halide or cesium halide catalysts, complete addition of ethylene oxide to polychlorophosphazenes was achieved and addition of propylene oxide was accomplished with the same catalyst. Other alkylene oxides and substituted oxiranes such as epichlorhydrin and epibromohydrin can be used in place of the ethylene oxide illustrated in the example. By varying the time of reaction or the catalyst concentration it is also possible to obtain a desired extent of cyclic ether addition. For example, when the procedure shown in the above example is followed, 50% addition of the epoxide is obtained after 24 hours of reaction. Similarly, when 15–20% of the above catalyst concentration is employed, approximately 45–50% epoxide incorporation is obtained after 96 hours of reaction. Stable products are obtained from such partially-incorporated materials by further reaction with the same or another cyclic ether, an alcohol, an amine or an organometallic compound.

It will be seen that the invention provides a simple and direct means for modifying known poly(chlorophosphazenes). The invention is also a useful and convenient method for modifying poly(alkoxychlorophosphazenes) and poly(alkylaminochlorophosphazenes). It is not intended that the invention be limited except as may be required by the appended claims.

What is claimed is:

1. In a process for reacting (1) a poly(chlorophosphazene) including both linear and cyclic poly(dichlorophosphazenes), and partially esterified or amidified cyclic or linear polyphosphazenes which contain P-Cl functions with (2) a cyclic ether or thioether, the improvement which comprises:
conducting the addition reaction in the presence of a catalyst comprising an alkali metal halide selected from the group consisting of Li and Cs halides which are soluble in the mixture of reactants.

2. The process of claim 1 wherein the catalyst is a lithium halide selected from the group consisting of LiCl and LiBr.

3. The process of claim 2 wherein the catalyst is LiBr.

4. The process of claim 1 wherein ethylene oxide and poly(dichlorophosphazene) are reacted in the presence of anhydrous LiBr.

References Cited
UNITED STATES PATENTS

| | | | |
|---|---|---|---|
| 2,157,164 | 5/1939 | Daly et al. | 260—977 |
| 2,610,978 | 9/1952 | Lanham | 260—977 |
| 2,883,411 | 4/1959 | Lanham | 260—977 X |

LORRAINE A. WEINBERGER, Primary Examiner

R. L. RAYMOND, Assistant Examiner

U.S. Cl. X.R.

260—927 N

UNITED STATES PATENT OFFICE
CERTIFICATE OF CORRECTION

Patent No. 3,804,927    Dated April 16, 1974

Inventor(s) David Francis Lawson, James M. Willis and Gary Stephen Kyker

It is certified that error appears in the above-identified patent and that said Letters Patent are hereby corrected as shown below:

Column 1, Line 47, "catalysts" should be --catalyst--.

Column 1, Line 48, "$(NPCl)_{2n}$" should be --$(NPCl_2)_n$--.

Signed and sealed this 10th day of September 1974.

(SEAL)
Attest:

McCOY M. GIBSON, JR.
Attesting Officer

C. MARSHALL DANN
Commissioner of Patents